United States Patent [19]

Ohno et al.

[11] Patent Number: 4,998,092
[45] Date of Patent: Mar. 5, 1991

[54] TIRE VALVE

[75] Inventors: Kiyoshi Ohno; Makoto Nakao, both of Tokyo; Kazuo Takenaka; Kazuki Iinuma, both of Gifu, all of Japan

[73] Assignees: Bridgestone Corporation, Tokyo; Pacific Industrial Co., Ltd., Gifu, both of Japan

[21] Appl. No.: 410,390

[22] Filed: Sep. 21, 1989

[30] Foreign Application Priority Data

Sep. 26, 1988 [JP] Japan .................................. 63-240345

[51] Int. Cl.$^5$ ............................................. B60C 23/00
[52] U.S. Cl. ..................... 340/445; 340/442; 340/448; 73/146.5; 73/146.8; 200/61.22; 116/34 R
[58] Field of Search ...................... 340/445, 442, 448; 73/146.8, 146.4, 146.5; 116/34 R, 34 A, 34 B; 200/61.22

[56] References Cited

U.S. PATENT DOCUMENTS

| 4,308,520 | 12/1981 | Darlington | 73/146.5 |
| 4,425,558 | 1/1984 | McConchie | 73/146.5 |
| 4,557,308 | 12/1985 | Kuypers | 73/146.8 |
| 4,788,525 | 11/1988 | Lichtenstein | 73/146.5 |

Primary Examiner—Donnie L. Crosland
Attorney, Agent, or Firm—Jordan and Hamburg

[57] ABSTRACT

In a tire valve suitable for detecting the pressure and temperature in a tire, the strain of the tire wheel and the like, a conductive core body of a valve core is electrically insulated from a conductive shaft, and, to a pedestal having a 1st electrode electrically shaft and a 2nd electrode electrically connected to a conductive valve stem via a core spring, a sensor having two sensor electrodes connected with the 1st and 2nd electrodes respectively is fixed.

5 Claims, 12 Drawing Sheets

TIRE VALVE

BACKGROUND OF THE INVENTION

This invention relates to a tire valve suitable for detecting the pressure or temperature in the tire, the strain of the tire wheel and the like.

Concerning an example of conventional devices for detecting the tire pressure, known are devices in which the detective means are fitted on the tire side, and, by applying electromagnetic induction, resonance of electromagnetic waves, etc., the tire pressure can be detected even while the automobile is in operation. They are called the non-contact system. Besides, other devices which trasmit the tire pressure through a slip ring, bar-type tire gauge, etc., the so-called contact system, are also known.

The tire pressure detective devices of the non-contact system among them have disadvantages that they are intricate in mechanism and expensive in manufacturing cost, and that the wheels are especially made for this system, the modification and the like of autombiles to use the system being are required. Further, it is difficult and costly to manufacture these devices so that they are durable in the face of environmental changes and are reliable and of consistent quality.

On the other hand, the tire pressure detective devices of the contact system have hitherto been developed as a low-cost means. However, when they break down, the air in the tire is released to the atmosphere due to their original construction. And defective operation, etc. are apt to occur under low temperature, due to freezing, during the winter season. Therefore, they have problems in reliability and safety, so they have not yet attained the stage practical use. Moreover, regardless of the tire pressure detective device, the tire valves are merely manufactured for the purpose of smoothly getting air into the tire while staying airtight, so they have a shortcoming that they have not the structure meeting the purpose of detecting the pressure, temperature, etc. in the tire.

Furthermore, for example, such a tire pressure indicator as described in an invention disclosed in U.S. Pat. No. 4,308,520 is known: a switch assembly, into which a suitable gas such as dry nitrogen is introduced, is mounted in a wheel-mounted transponder unit. The tire pressure is detected by this assembly. And the transponder unit induces a signal of a phase polarity corresponding to whether the tire pressure is "safe" or "low", which signal is processed by a separate handheld interrogator unit indicates whether the tire pressure is "safe" or "low".

However, the tire pressure indicator has drawbacks that the switch assembly is forced to be constructed unavoidably large; besides, as lead connecting the switch assembly with coil and terminals, etc. for connecting the lead are provided in the transponder unit, the unit is also obliged to become large size.

An invention related to the present invention is disclosed in U.S. Pat No. 4,918,423, having an assignee in common with one of the present assignees.

SUMMARY OF THE INVENTION

Therefore, one of objects of this invention is to provide a simply structured tire valve suitable for detecting the pressure or temperature in the tire, the strain of the tire wheel and the like.

Another object of this invention is to provide such a tire valve which is small in size, meets the usual dimensional standards and is of, improved reliability the tire valve detecting the tire pressure, etc. by a small sensor and by electrically connecting an output signal of said sensor with a resonance circuit without connecting through a lead.

In order to achieve the above-mentioned objects, the tire valve of this invention comprises as mentioned below:

A conductive barrel and a conductive core pin composing a valve core being inserted into a conductive valve stem fitted in the tire wheel are electrically insulated. And in a pedestal in which the 1st electrode electrically conducting to the core pin and the 2nd electrode electrically conducting to a conductive spring are fitted, a sensor having sensor electrodes connecting respectively with the 1st and 2nd electrodes is also fitted. And the spring electrically conducts to the valve stem by making contact with the latter. An electric signal from the sensor electrode on one side is transmitted to said core pin through the 1st electrode, and an electric signal from the other sensor electrode on the other side is transmitted to the valve stem from the 2nd electrode via the spring.

Further, the tire valve of this invention comprises, in addition to the above, a valve cap having the 1st electrode electrically connecting to the core pin of the valve core, the 2nd electrode electrically connected to the valve stem, and an electric circuit adapted to send the outside of the tire valve an electric signal corresponding to the functioning state of the sensor.

Furhtermore, the electric circuit is desirably constructed as a resonance circuit adapted to be resonant with external radiant electromagnetic waves.

According to this invention, in case, for example, the tire pressure is lower than the prescribed value the sensor in the pedestal of the valve core functions, and electrically connects the core pin of the valve core to the valve stem, and then transmits the electric signal to the core pin and the valve stem. The signal transmitted to the core pin and the valve stem is detected by an appropriate detective means. In this way, low tire pressure can be detected. When a temperature sensor is fitted in the pedestal, the temperature in the tire can be detected, and when a strain detective sensor is fitted in the pedestal, the strain of the tire wheel can be detected.

DESCRIPTION OF THE PREFERRED EMBODIMENTS

Figure 1:
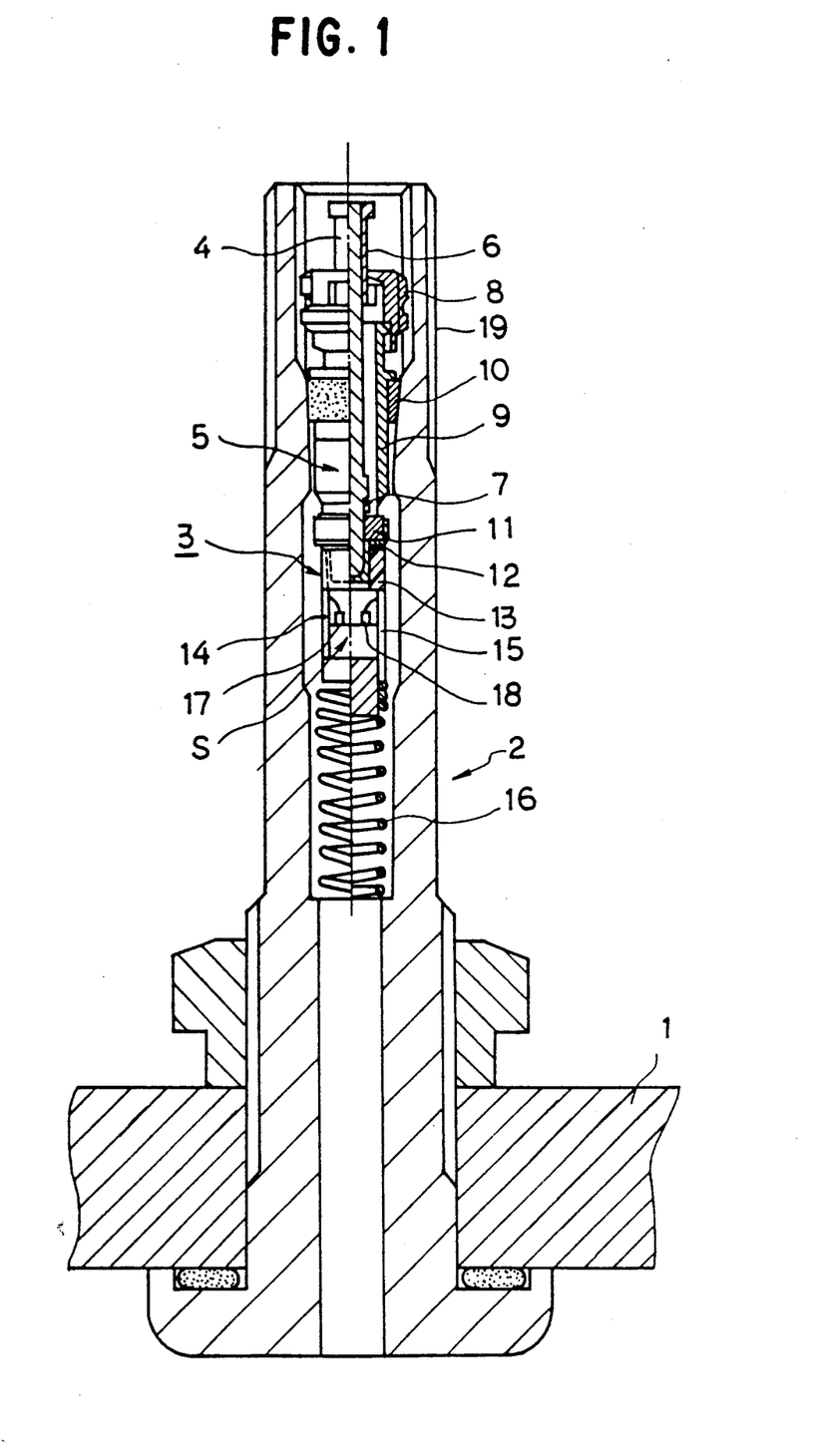
FIG. 1 is a partial sectional view showing an embodiment of a tire valve of this invention.
Figure 2:
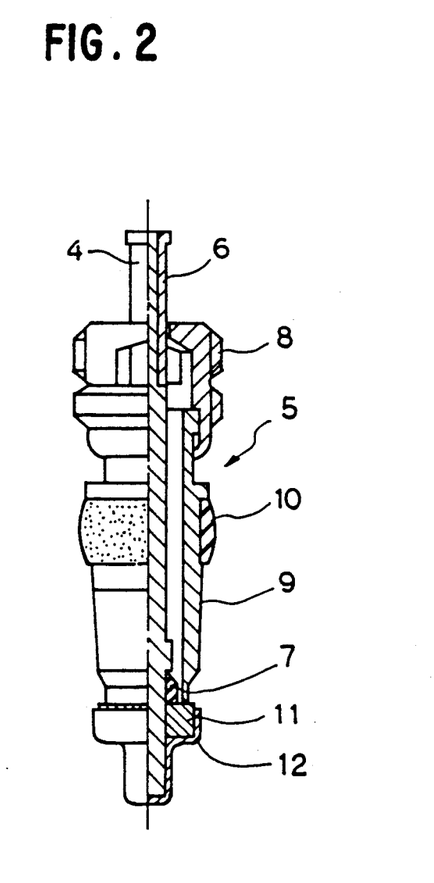
FIG. 2 is a partial sectional view of a core pin and a barrel adapted for use in the embodiment of FIG. 1.

Preferred embodiments of this invention will now be described in the following with reference to the accompanying drawings:

In FIG. 1, a tire valve of an embodiment of this invention is formed by inserting a valve core 3 into a conductive valve stem 2 fixed to a tire wheel. A conductive core pin 4 forming the valve core 3 is electrically insulated from a conductive barrel 5. The electrically insulated means are achieved by fitting the core pin 4 with insulators 6 and 7. That is, the insulators 6 and 7 are formed by covering the core pin 4 with materials such as synthetic resins. The barrel 5 consists of, as shown in FIG. 2, a barrel 9, an electrically conducting head 8 and a non-conducting barrel gasket 10, and the lower end of the barrel 9 is directly connected with a non-conducting cup gasket 11 which is housed in a conductive plunger cup 12. Also, the lower end of the core pin 4 is inserted into the plunger cup 12. The lower end of the plunger cup 12 is to be fitted into a hole 13A of a non-conducting pedestal 13 shown in FIG. 3. As shown in the same figure, the 1st electrode 14 electrically connected to the core pin 4 and the 2nd electrode 15 electrically conducting to a conductive spring 16 are attached to the pedestal 13 composed of insulator.

Further, as shown in FIG. 1, an air pressure sensor S having sensor electrodes 17 and 18 which are respectively connected to the 1st electrode and 2nd electrode is situated in the pedestal 13. And the spring 16 is fitted to the lower part of the prdestal 13. The valve core 3 equipped with the sensor S having the sensor electrodes 17 and 18 is inserted, as shown in FIG. 1, into the valve stem 2. When the head of the core pin 4 is pushed down, the spring 16 is held down, and the compressive condition between the barrel 9 and cup gasket 11 is released, allowing the air in the tire to flow out to the outside or the air to flow in.

Figure 3:
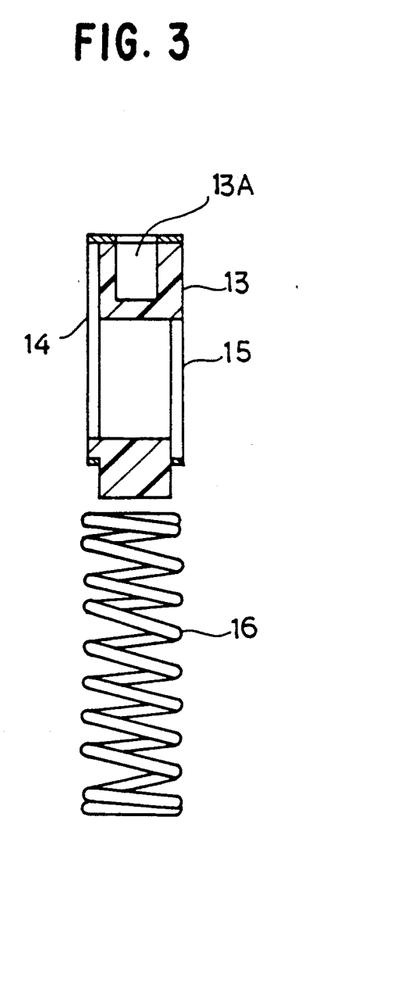
FIG. 3 is a partial sectional view of parts constituting a valve core of the embodiment of FIG. 1 other than the core pin and barrel of FIG. 2.
Figure 4:
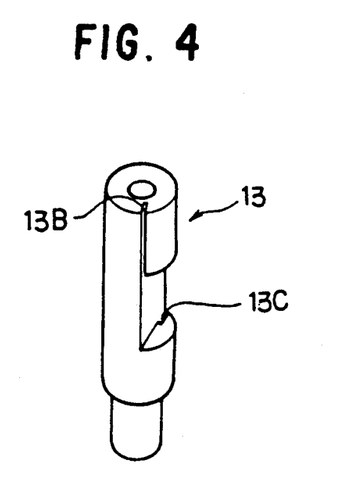
FIG. 4 is a perspective view of a pedestal of FIG. 3.
Figure 5:
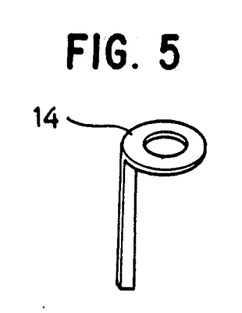
FIGS. 5 and 6 are perspective views showing respectively the 1st electrode and the 2nd electrode employed in the parts of FIG. 3.
Figure 6:
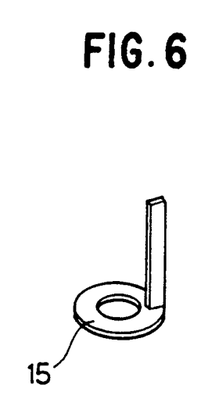
Figure 7:
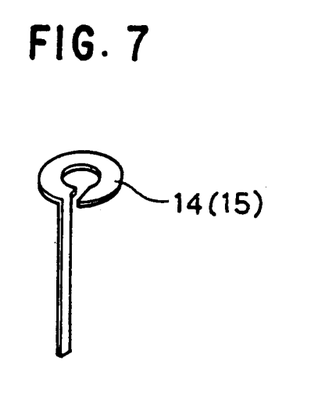
FIG. 7 is a perspective view illustrating a modified form of the 1st and 2nd electrodes of FIGS. 5 and 6.

Details of the construction of the barrel 5 are as shown in FIG. 2. The detailed constructions of the pedestal 13 having the 1st and 2nd electrodes 14 and 15 and of the spring 16 are as shown in FIG. 3. FIG. 4 shows a perspective view of the pedestal 13, in which slits 13B and 13C are formed, and slender bar-shaped portions of the 1st and 2nd electrodes extending in a longitudinal direction are respectively fitted into said slits 13B and 13C. The 1st and 2nd electrodes 14 and 15 are illustrated in FIGS. 5 and 6 respectively. In addition, instead of electrodes as shown in FIGS. 5 and 6, it is possible to use an electrode 14 (15) as shown in FIG. 7.

In addition to the cylindrical spring 16 show in FIG. 3, a spring may be formed as an inverse tapered spring whose diameter becomes larger in proportion as it approaches the bottom and which makes contact with an electrically conducts to the valve stem 2. An electric signal from the sensor electrode 17 is transmitted to the core pin 4 from the 1st electrode 14, while an electrical signal from the sensor electrode 18 is transmitted to the valve stem 2 from the 2nd electrode 15 via the spring 16. Although the construction is such that the electric signal from the sensor electrode 17 is transmitted to the core pin 4 via the plunger cup 12 from the 1st electrode 14, the construction may be such that the signal is directly transmitted to the core pin 4 from the 1st electrode 14. Besides, it is also possible to use two or more sensor S, and also to set up an electronic circuit (not only a circuit 21 shown in FIG. 9 discussed later but also various circuits) to the sensor S. Moreover, the sensor S is not limited to air pressure detecting sensors but may be various well-known sensors detecting the temperature in the tire or the strain of the tire wheel according to the purpose.

Figure 8:
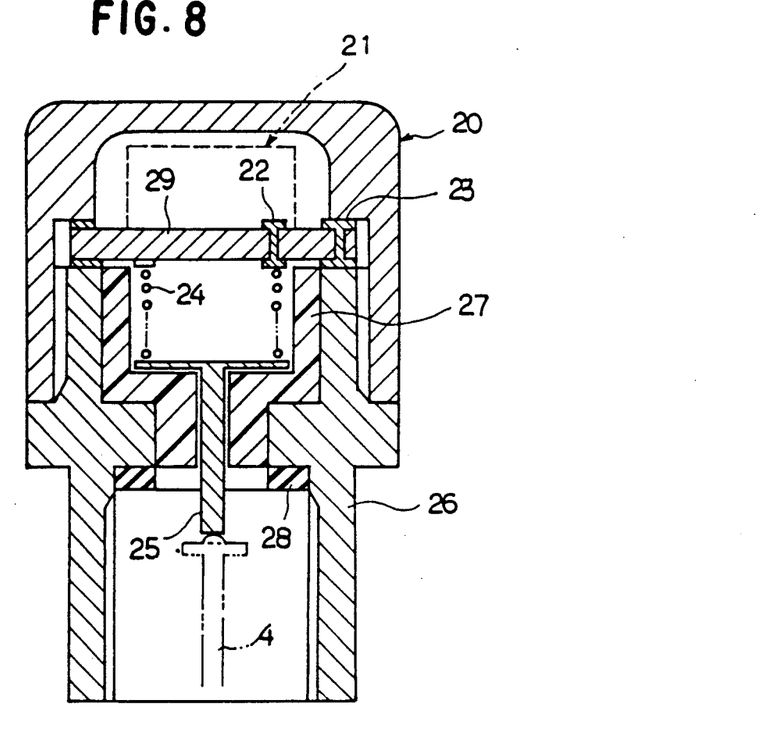
FIG. 8 is a sectional view of an example of a valve cap.

The thread of a screw 19 is formed on the top outer circumference of the valve stem 2 shown in FIG. 1. And a valve cap 20 is screwed onto the screw 19. As for cap 20, the one having such structure as shown in FIG. 8 may be use. The circuit 21 is fitted in the valve cap 20, and the 1st electrode 22 and the 2nd electrode 23 of the circuit 21 are connected to the circuit 21. The 1st electrode 22 is connected to a conductive valve cap spring 24 which contacts an electrode 25. Also, the electrode 25 is to be electrically connected to the core pin 4. That is, an electric signal from the core pin 4 is transmitted to the valve cap spring 24 through the electrode 25, then the signal is transmitted from the 1st electrode 22 to the circuit 21. On the other hand, a signal transmitted to the valve stem 2 is sent to the 2nd electrode 23 via a conductive cylinder 26 of the valve cap 20. From the 2nd electrode 23, the signal is transmitted to the circuit 21.

Figure 9:
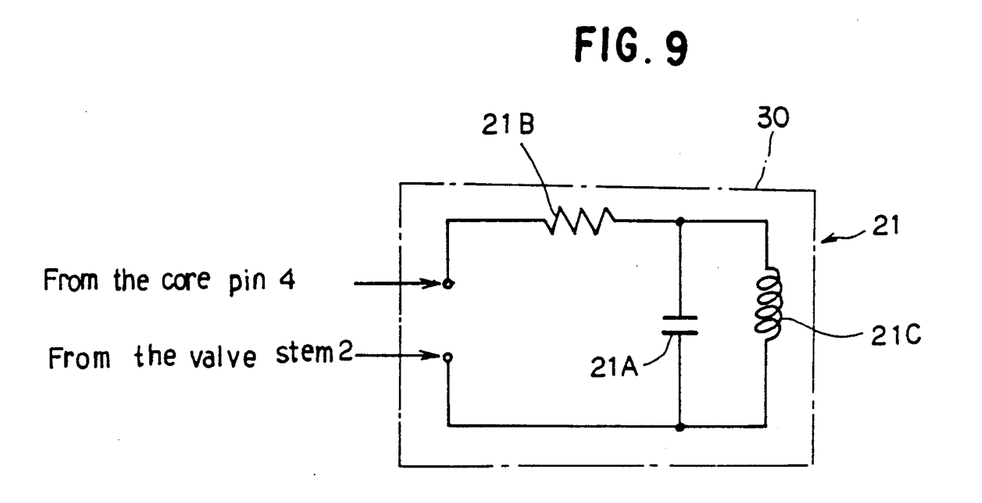
FIG. 9 is a circuit diagram showing the circuit used in the valve cap of FIG. 8.

The part shown with the reference numeral 27 of FIG. 8 is an insulator, and the reference numeral 28 shows a non-conducting gasket of the valve cap 20. Also, the reference numeral 29 shows a circuit base plate to which the electrodes 22 and 23 are fixed. As shown in FIG. 9, the circuit 21 is equipped with a capacitor 21A, resistor 21B and coil 21C, which from a resonator 30 in all.

Figure 10:
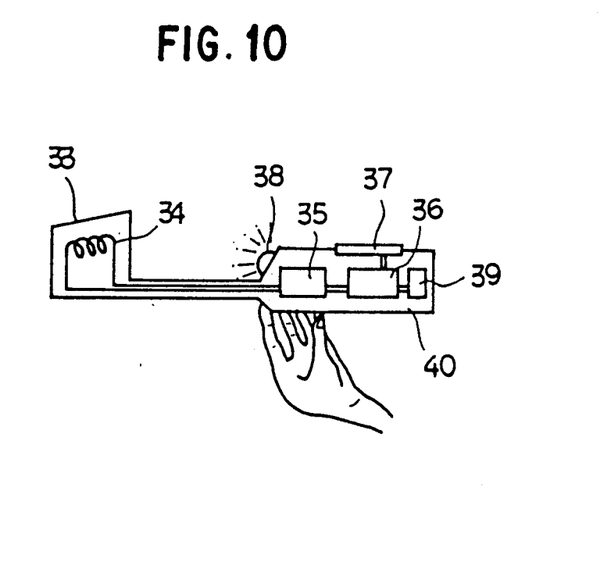
FIG. 10 is a front view of an embodiment of detective means which can be used for the tire valve of this invention.
Figure 11:
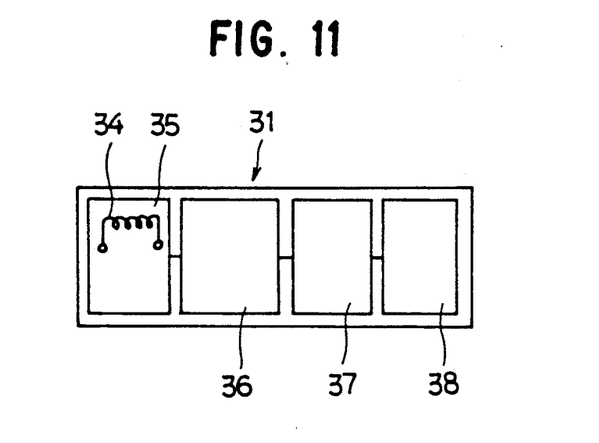
FIG. 11 is a block diagram showing the circuit of the detective means of FIG. 10.

In order to obtain the information in the tire by utilizing the resonator 30 formed by the circuit 21, an example of a detective means 31, shown in FIG. 11, which can be used for the tire valve of this invention has, as shown in FIG. 10, an oscillating coil 34 situated in a front end 33 and an oscillator 35 to which the oscillating coil 34 is connected. The oscillator 35 is connected to a signal processor 36 which is connected to a display 37. In addition, a battery 39, which is the power source of a lamp 38, the oscillator 35, etc., are housed in a casing 40. The lamp 38 is mounted so that one can clearly see the valve even in the dark. The display 37 so functions that when the information in the tire detected, e.g., the tire pressure, is at the proper value, a green lamp lights and a nice chime sound is produced, and when it is less than the proper value, a red lamp lights and warning sound of a buzzer, etc. is produced.

Figure 12:
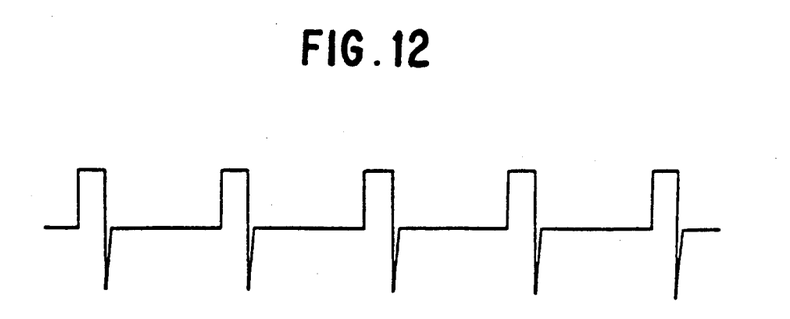
FIGS. 12 through 14 are wave form charts of output signals from detective means of FIG. 10.
Figure 13:
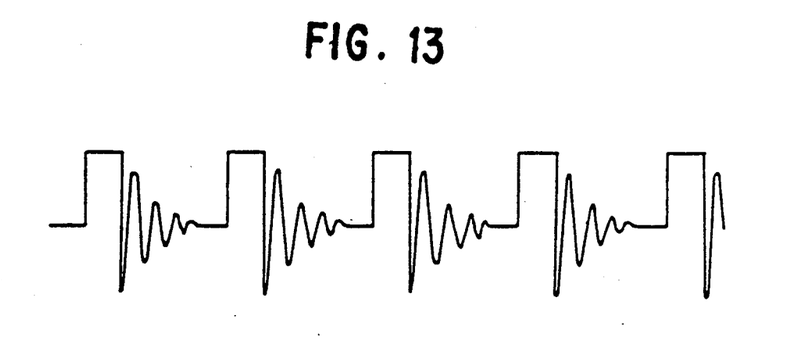
Figure 14:
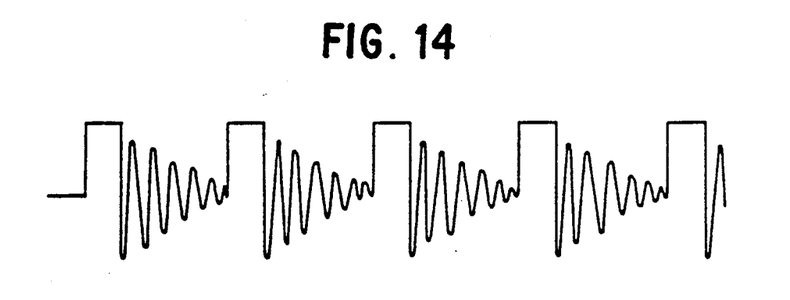

FIG. 11 is a block diagram of the circuit housed in the casing 40 of the detective means 31. FIG. 12 is a wave form chart of the osciallating current indicating the oscillating state of the oscillator 35 when the front end 33 is not made to approach the resonator 30 (the circuit 21 fitted in the valve cap 20). FIGS. 13 and 14 are show wave form charts illustrating the state that the oscillating current of the oscillator 35 changes when the front end 33 is made to approach the resonator 30. The wave form illustrated in FIG. 13 shows the state that the tire pressure is in the normal state and the sensor S is in the "on" condition, while the wave form of FIG. 14 shows that the tire pressure is in the abnormal state and the sensor S is in the "off" condition. That is, the sensor S functions depending on the condition of the tire pressure, and load impedance of the capacitor 21A in the resonator 30 changes, which brings about some changes in the wave forms of FIGS. 13 and 14. The signal processor 36 detects and makes the comparison, etc. of the change in the wave forms of the output signal from the oscillator 35. In case of the state as shown in FIG. 13, the green lamp lights, and in case of the state as shown in FIG. 14, the red lamp lights to warn that the tire pressure is lower than the proper value. Besides, the entire circuit 21 may not in all cases be incorporated in the cap 20 but may be incorporated in a member installed in the valve stem 2 or in the valve core 3 or in both.

Figure 15:
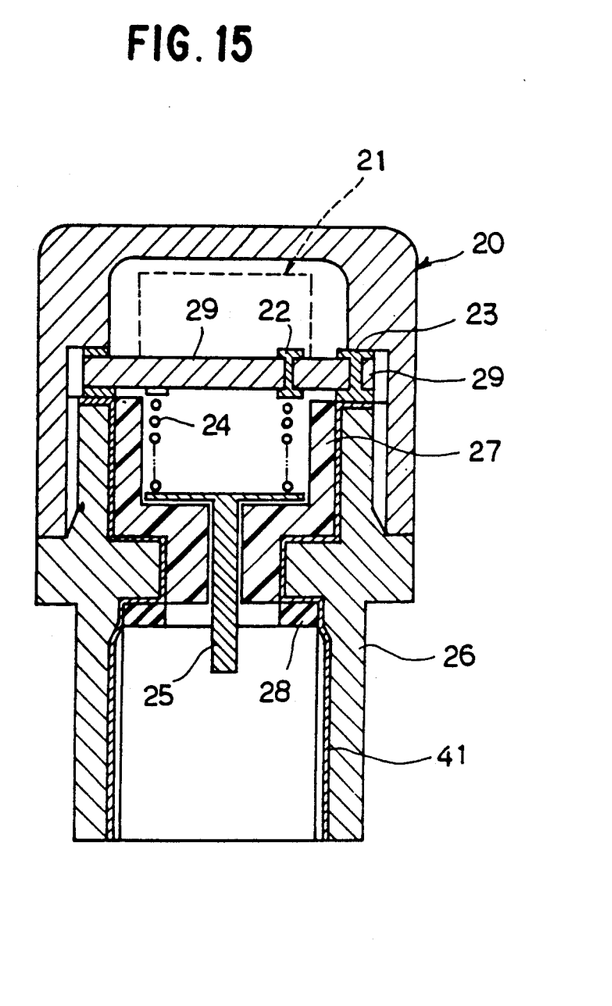
FIG. 15 is a sectional view of another valve cap in which the circuit portion is built.

The valve cap 20 shown in FIG. 15 is an example in which the cylinder 26 in the valve cap 20 is not formed of an electric conductor but of a plastic and the electric signal from the valve stem 2 is transmitted to the 2nd electrode 23 in the circuit 21 through an electrode 41 plated with metal and the like.

Figure 16:
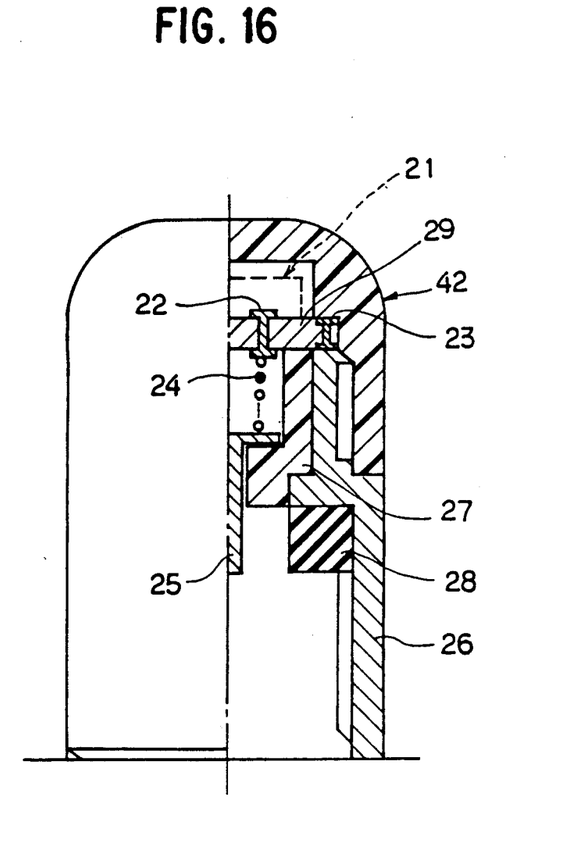
FIG. 16 is a partial sectional view of another example of the valve cap fitted to the valve core.

In additon, concerning the shape of the valve cap 20, the shape shown in FIG. 16 may be used. As having been described in connection with FIG. 8 above, explanation of components such as the circuit 21 will be omitted by merely marking with the same reference numerals. Though, the conductive cylinder 26 contacts the valve stem 2 and electrically conducts to the same.

Also, by incorporating a battery and an indicator such as LED in the valve cap 20 and making the valve cap 20 transparent or semitransparent, the valve cap 20 may be made noticeable at a glance.

Figure 17:
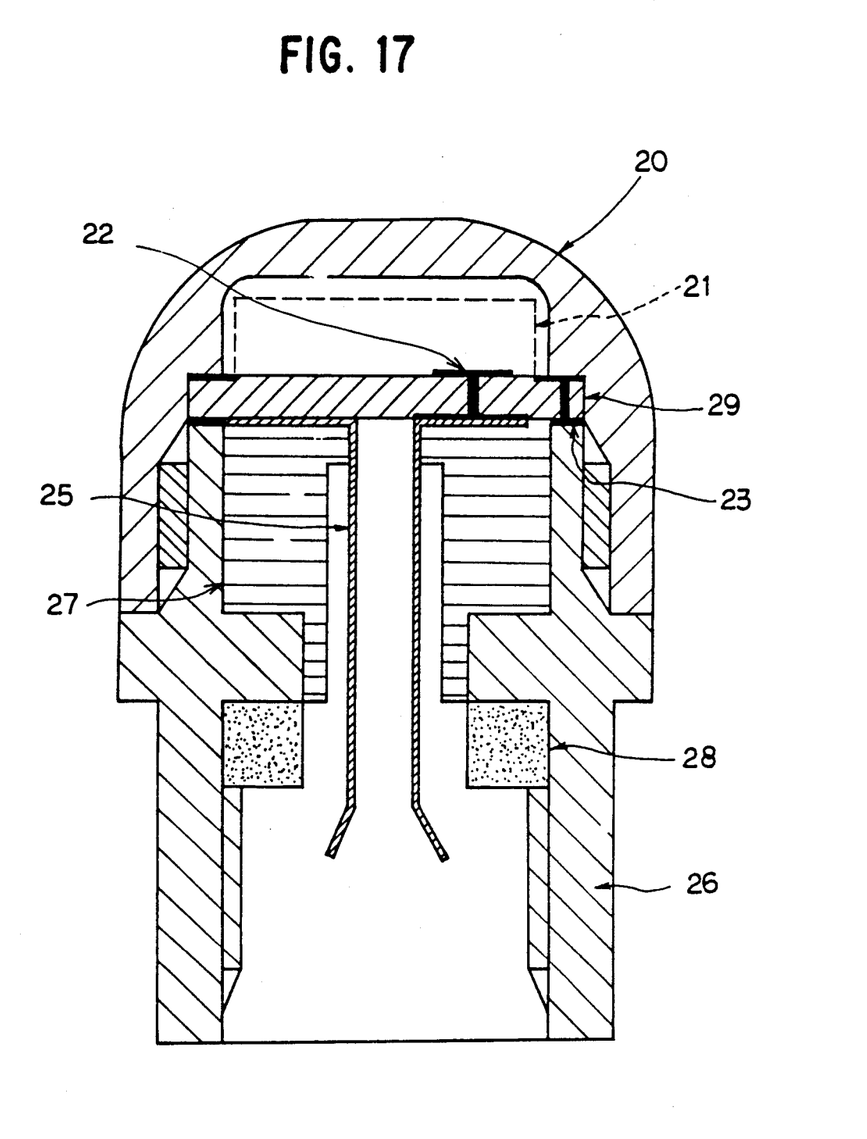
FIGS. 17 to 32 are sectional views of other various means for electrically connecting the core pin with the circuit portion.
Figure 18:
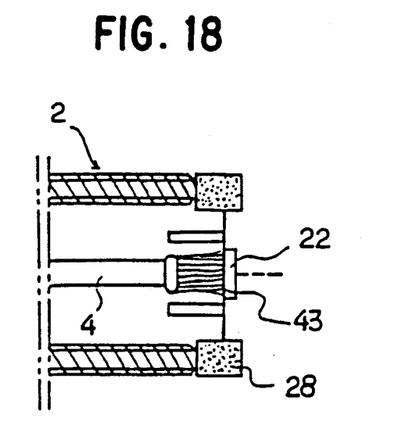
Figure 19:
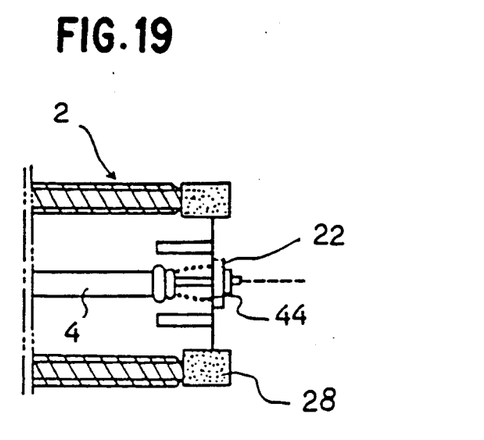
Figure 20:
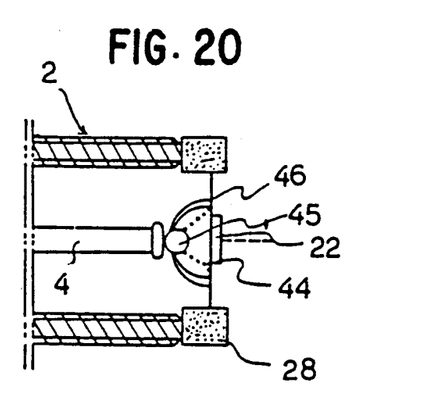
Figure 21:
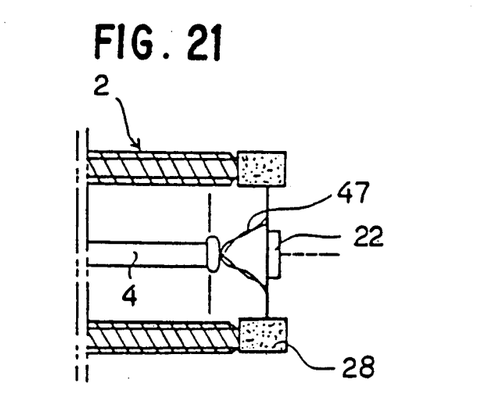
Figure 22:
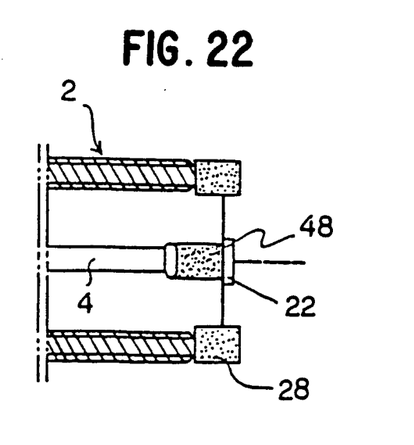
Figure 23:
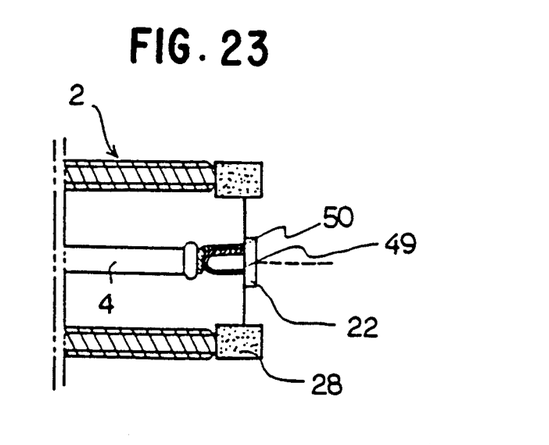
Figure 24:
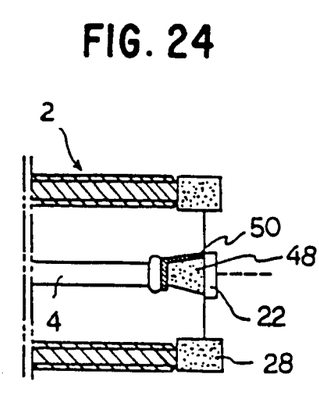
Figure 25:
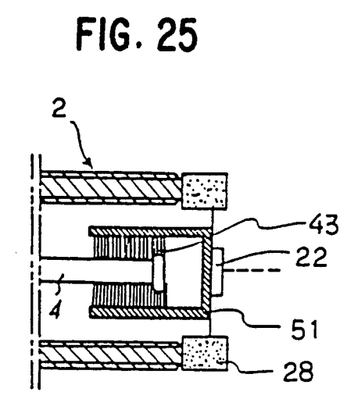
Figure 26:
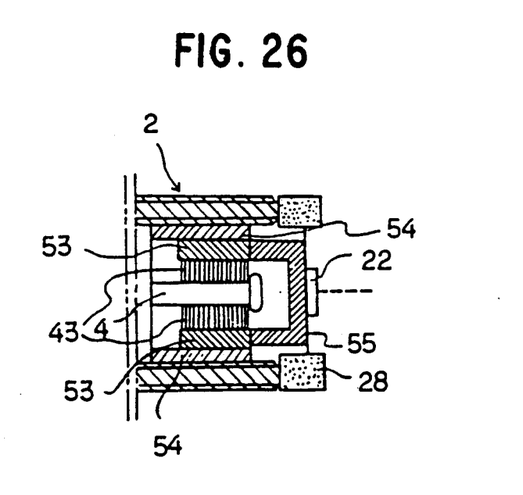
Figure 27:
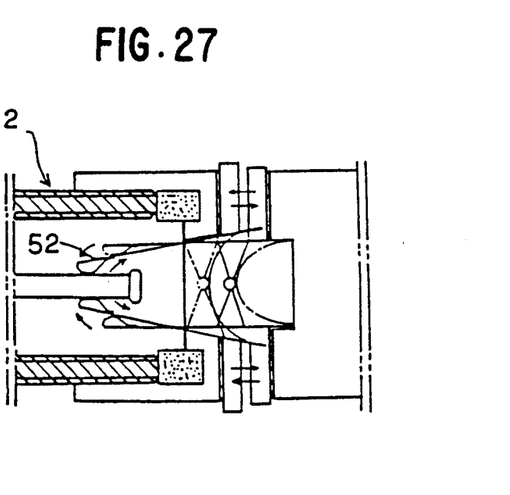
Figure 28:
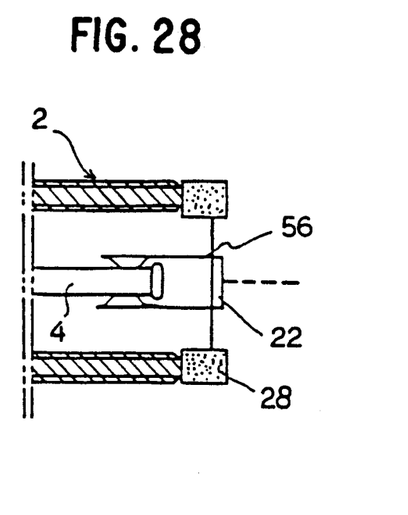
Figure 29:
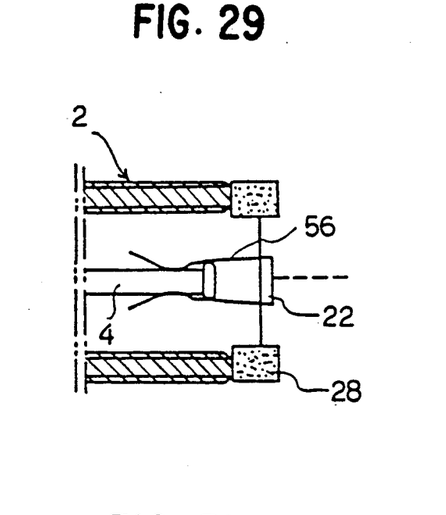
Figure 30:
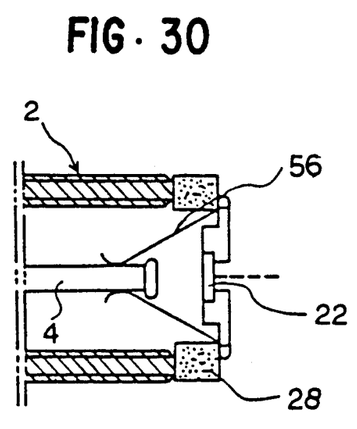
Figure 31:
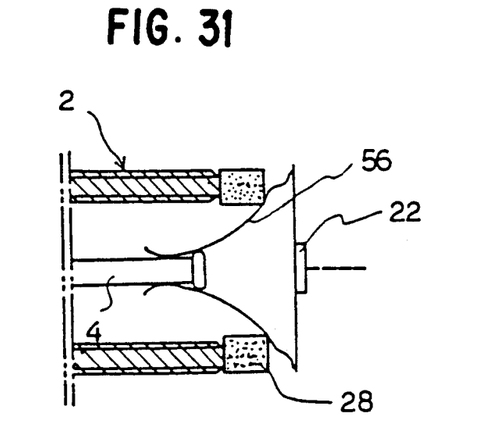
Figure 32:
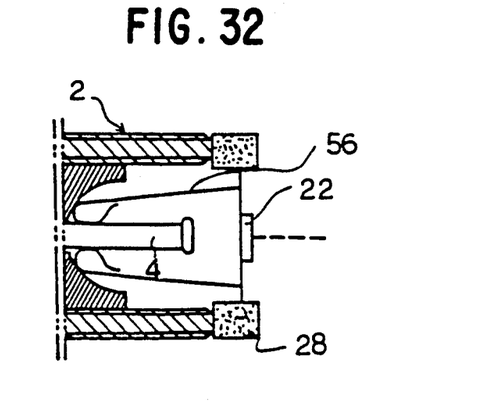

FIG. 17 and subsequent figures are to show various means to electrically connect the core pin 4 with the circuit portion 21. In FIG. 17, the electrode 25 is formed with leaf springs. The upper end of the core pin 4 is an electric conductor where insulator 6 is not provided. In FIG. 18, a conductive brush 43 is employed as the electrode 25, while in FIG. 19, a conductive spring 44 is adopted as the electrode. FIG. 20 shows that, by insulating the spring 44 and a conductive metal ball 45 as well as a non-conducting guide 46, electric conduction between the core pin 4 and the circuit portion 21 is achieved. Also, in FIG. 21, a metal spring 47 is used as the electrode 25, while in FIG. 22, a conductive rubber 48 is adopted. In FIG. 23, a hollow rubber element 49 and a metal plate 50 are incorporated, while FIG. 24 shows a modification of the structure of FIG. 23. FIG. 25 illustrates that a conductive guide 51 is provided, and in the inner circumference of which the conductive brush 43 is fitted. In an embodiment of FIG. 26, conductive fixture 53, in which the conductive brush 43 making contact with the side of the core pin 4 is planted, is incorporated on the side of the valve stem 2 via an insulator 54, and makes contact with a metal tube 55 from the direction of the valve cap 20. FIG. 27 shows that, when the valve cap 20 is screwed down, a clip 52 constituting the electrode 25 is tightly fastened to the side of the core pin 4. Moreover, FIG. 28 through FIG. 32 indicate embodiments in which variously shaped conductive springs 56 are employed as the electrode 25.

In the embodiments of FIGS. 20, 21, 31, 32, etc., the conductive springs 44 and 47 as well as the conductive spring 56 are electrically connected with the electrode 22 through a conductor pattern having through-holes to the circuit base plate 29. In addition, it is possible to fix an electronic circuit alone to a pedestal B instead of fitting the sensor S to the pedestal 13 (by fitting the sensor elsewhere).

As described in the foregoing, this invention makes it possible to simply construct the tire valve for facilitating tire inspection by merely replacing the valve core and valve cap without changing the valve stem among the componets of the tire presently in use, and requires no special work on the wheel. In addition, this invention can be realized at low cost without manufacturing to high performance standards. That is, in case that some contrivance is to be made on the valve stem side, high durability, etc. are required.

The parts constituting the valve core of the present invention are easily manufactured at low cost. In addition, the tire valve of this invention can be constructed to meet the usual standards on shapes, and there is little possibility of the leads breaking due to vibrations and the like, so it has high reliability.

What is claimed is:

1. A tire valve comprising:
   a conductive valve stem fitted in the tire wheel; and
   a valve core inserted into said valve stem;
   said valve core having
      a barrel an electrically conductive core pin which is electrically insulated from said valve stem,
      a pedestal to which a 1st electrode electrically connected to said core pin and a 2nd electrode electrically connected to a spring are fitted, and
      a sensor having two sensor electrodes connected with said 1st electrode and 2nd electrode respectively and being fixed to said pedestal,
      said spring providing resilience to said pedestal and electrically connecting said 2nd electrode to said valve stem.

2. A tire valve according to claim 1 wherein a valve cap is also provided, said valve cap is equipped with an electric circuit and, when said valve cap is fitted onto said valve stem said circuit is electrically connected with said sensor through said core pin and said valve stem, for sending outside of the tire valve an electric signal corresponding to the functioning state of said sensor.

3. A tire valve according to claim 2 wherein said electric circuit is a resonance circuit for resonating with external radiant electromagnetic waves.

4. A tire valve according to claim 1 wherein said barrel is electrically conductive and said core pin is electrically insulated from said barrel.

5. A tire valve according to claim 4 wherein a valve cap is also provided, said valve cap is equipped with an electric circuit and, when said valve cap is fitted onto said valve stem, said circuit is electrically connected with said sensor through said core and said valve stem for sending outside of the tire valve an electric signal corresponding to the functioning state of said sensor.

* * * * *